United States Patent [19]

Hickson

[11] 4,177,653
[45] Dec. 11, 1979

[54] SLUSH FILTRATION METHOD

[75] Inventor: Donald A. Hickson, Benicia, Calif.

[73] Assignee: Chevron Research Company, San Francisco, Calif.

[21] Appl. No.: 953,293

[22] Filed: Oct. 20, 1978

[51] Int. Cl.$^2$ ............ F25D 3/12; B01D 37/00
[52] U.S. Cl. .................................. 62/534; 210/71
[58] Field of Search ............ 210/71; 62/534, 535, 62/542

[56] References Cited

U.S. PATENT DOCUMENTS

| 3,202,283 | 8/1965 | Liv ............................. 210/71 |
| 3,702,886 | 11/1972 | Argauer et al. .............. 423/328 |
| 3,993,555 | 11/1976 | Park et al. .................... 210/71 |
| 4,018,682 | 4/1977 | Boyer ........................... 210/71 |

*Primary Examiner*—William A. Cuchlinski, Jr.
*Attorney, Agent, or Firm*—D. A. Newell; R. H. Davies; R. H. Evans

[57] ABSTRACT

A method for separating collidal zeolite crystals from aqueous mother liquor solutions with conventional filtration apparatus by initially freezing the dispersion to a slush and conducting the filtration operation as the slush melts.

4 Claims, No Drawings

SLUSH FILTRATION METHOD

BACKGROUND OF THE INVENTION

1. Field of the Invention

This invention relates to a novel method of separating colloidal particles from an aqueous solution, and particularly relates to separating fine zeolite crystals from their mother liquor.

2. Description of the Prior Art

Crystalline aluminosilicate zeolites, such as ZSM-5 and ZSM-35, may be prepared from an aqueous mother liquor solution containing sources of alkali metal oxide, aluminum oxide, silicon oxide, and ethylenediamine, pyrrolidine or tetrapropylammonium cations (U.S. Pat. No. 3,702,886 and 4,016,245). The crystals produced are generally in the size range of 0.005 to 0.3 micron in diameter and remain suspended or dispersed in the mother liquor in a colloidal state (U.S. Pat. Nos. 3,992,466 and 3,926,782). Since ordinary filters have paper or canvas filter cloths with pore sizes of approximately 40 microns, such filters are impractical for use in separating the zeolite particles from the mother liquor.

In attempting to solve the problem of separating the dispersed zeolites from the solution, the prior art has suggested the use of various agglomerating agents, centrifuges, flocculants and frothing systems (U.S. Pat. No. 3,902,993). A simple, yet highly effective method has now been developed which is quite suitable for laboratory or commercial processes and has the added advantage in that the method does not require the use of costly additional equipment.

SUMMARY OF THE INVENTION

The present invention relates to a process for separating colloidal-sized zeolite crystals from a liquid dispersion of the particles, such as would be encountered in the crystalline growth of the zeolite from an aqueous solution. In accordance with the invention, the liquid dispersion or mother liquor containing the crystals is cooled to form a slush. The slush is allowed to melt and the colloidal particles or crystals are filtered from the melting slush with conventional filter apparatus.

In a preferred embodiment of the invention, the cooling of the liquid dispersion is accomplished by mixing or adding $CO_2$ snow to the liquid. The snow converts the liquid to a creamy slush which may be filtered with conventional filter apparatus to obtain a zeolite filter cake and a clear filtrate.

DETAILED DESCRIPTION OF THE PREFERRED EMBODIMENTS

Approximately 30 pounds of ZSM-5-type zeolite crystals were produced in a 100-gallon container by procedures similar to those outlined in the literature. The crystals were approximately 0.3 micron in diameter, and all attempts at separation of the crystals from the solution with regular filtration techniques and standard filtration cloths failed, since the zeolite passed through the filter cloth with the filtrate.

The dispersion was frozen to a creamy slush by the addition of $CO_2$ snow. $CO_2$ snow is a crystalline precipitate of carbon dioxide and may be formed by allowing liquid carbon dioxide from a pressurized cylinder to expand to atmospheric pressure. $CO_2$ snow in an amount equal to approximately 25 weight percent of the liquid dispersion will result in the desired slush consistency.

The slush was transferred to a vacuum filter having an ordinary canvas membrane and allowed to melt. Filtration proceeded during the course of melting to obtain a clear filtrate and zeolite filter cake. Although a vacuum filter is preferred, the melting slush may be satisfactorily filtered with non-vacuum apparatus.

What is claimed is:

1. A process for separating colloidal zeolite particles from a liquid dispersion of the particles, which comprises: cooling the liquid dispersion of the particles to form a slush; allowing the slush to melt; and filtering the colloidal particles from the melting slush during the course of melting.

2. A process as recited in claim 1, wherein said cooling is accomplished by the addition of $CO_2$ snow to a liquid dispersion of the particles.

3. A process as recited in claim 2, wherein said $CO_2$ snow is added to the liquid dispersion in an amount equal to approximately 25 weight percent of the liquid dispersion.

4. A process for separating colloidal zeolite crystals from a liquid dispersion of the crystals in their mother liquor, which comprises: cooling the liquid dispersion of the crystals in their mother liquor to form a creamy slush by the addition of $CO_2$ snow to the mother liquor; allowing the slush to melt; and vacuum filtering the colloidal zeolite crystals from the melting slush during the course of melting to form a clear filtrate and a crystal filter cake.

* * * * *